Sept. 30, 1952      I. C. BLAKE      2,612,535
PRIMARY CELL
Filed April 24, 1951
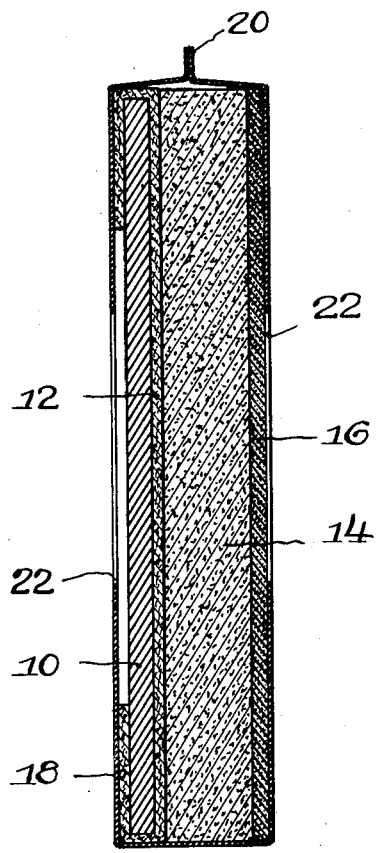
Inventor,
Ivan C. Blake,
By: Jones, Tesch & Darbo Patented Sept. 30, 1952

2,612,535

UNITED STATES PATENT OFFICE 2,612,535

PRIMARY CELL

Ivan C. Blake, Freeport, Ill., assignor to Burgess Battery Company, Freeport, Ill., a corporation of Delaware Application April 24, 1951, Serial No. 222,706

5 Claims. (Cl. 136—107)

This invention relates to improvements in primary battery cells and particularly to current-producing primary cells in which the negative electrode is composed of magnesium.

The use of magnesium as the negative electrode of current-producing primary cells is very attractive to the primary battery industry because of the higher electronegative character and the greater electrolytic activity of magnesium in comparison to that of the commonly used metal zinc, with the resulting higher voltage and greater current delivering powers of the cells employing magnesium. However, much difficulty has been encountered in the use of magnesium because of its great susceptibility to spontaneous corrosion, with resulting deterioration of the cells when in storage or on shelf.

Cells having magnesium negative electrodes and water as the solvent of the electrolyte are known and it is these cells which are subject to the difficulty mentioned heretofore.

In the copending application of Joseph J. Coleman and Demetrios V. Louzos, Serial No. 61,244, filed November 20, 1948, now U. S. Patent 2,597,451 granted May 20, 1952, a primary cell is disclosed having magnesium as the negative electrode and an electrolyte in which the solvent component is methanol and the solute component is from the group consisting of the chlorides, nitrates and perchlorates of magnesium and the metals electronegative to magnesium. Such a cell possesses substantial current-delivering properties and shelf life.

In accordance with the present invention, a cell is provided having magnesium as the negative electrode and having an electrolyte in which the solute component is a compound from the group consisting of the chlorides, nitrates and perchlorates of magnesium and the metals electronegative to magnesium and the solvent component is a mixture of water and methanol. There is incorporated in the cell a compound containing chromium, such as chromium trioxide and the salts of chromic acid. It has been found that such a cell has greater current-delivering capacity than similar cells employing methanol alone as the solvent, and has a substantial shelf life. Within certain ranges of proportions of the mixture of water and methanol, the cell has greater capacity than a similar cell employing water alone as the solvent.

Accordingly, it is the object of the invention to provide a primary battery cell of the character described which possesses relatively great energy delivering powers and a substantial shelf life.

Other objects and advantages will become apparent as the following description progresses.

While the invention relates to the composition of the cell, it will be described in connection with a specific embodiment. Such embodiment is illustrative only, and the cell may be in any desired physical form.

The single figure of the drawing is a sectional elevation of the said specific embodiment.

The single cell illustrated is of flat wafer shape and is especially adapted for use in a relatively high voltage battery in which a plurality of the cells are arranged in stacked relation and connected together in series. The cell is made up of juxtaposed flat elements consisting of, in the order named, the negative electrode 10, the bibulous separating member 12, the depolarizing mix 14 and the positive electrode 16. The bibulous separator 12, in addition to covering the surface of the negative electrode 10 facing the depolarizing mix 14, preferably covers the edges of the electrode 10 and the marginal portions of the opposite surface thereof. The separator 12 and the depolarizing mix 14 are liquid absorbent and are moistened with the liquid electrolyte, which will be described in detail hereinafter. The said elements are enclosed in an envelope 18 of a non-conductive, liquid-impervious, electrolyte-resistant sheet material, which may be a flexible film of rubber hydrochloride, a polymer of ethylene, the copolymer of vinyl chloride and vinyl acetate, or the like.

The envelope may be formed in any suitable manner and that shown in the drawing is formed by placing one edge of the assembled elements against the median portion of a sheet of the envelope material and folding the latter so that the portions thereof on opposite sides of the fold cover the opposite broad surfaces of the assembled elements and extend beyond the edges thereof. The extending portions are then joined together by an adhesive or by heat-sealing, to form the joint indicated at 20. Openings or windows 22 of substantial size are provided in the broad portions of the envelope 18 which overlie the negative and positive electrodes 10 and 16, respectively. Said openings are in alignment with each other and a number of the cells are adapted to be stacked together in pressure engagement to form a battery with the negative electrode 10 of one cell suitably connected to the positive electrode 16 of the adjacent cell through the windows 22.

As stated heretofore, the negative electrode 10 is composed of magnesium. The separating member 12 may be composed of a suitable bibulous material, such as absorbent paper or pulp. The depolarizing mix 14 may be composed of a mixture of a suitable oxidizing agent and a conductive agent, such as carbon or graphite. Examples of suitable oxidizing agents are manganese dioxide, lead dioxide, cupric oxide, silver chloride, the persulfates of sodium and potassium, or the like. Silver chloride is itself conductive, and where it is used a separate conductive agent is not required. A mixture of finely divided manganese dioxide and carbon has been found to be very satisfactory. The positive electrode 16 may be a flexible sheet, the conductive factor of which is carbon. Such conductive sheet material is known and may be composed of carbon particles cemented together by a binder or it may be a porous fabric sheet, such as cotton, rayon, and the like impregnated and coated with the carbonaceous composition.

In accordance with the present invention, the solvent component of the electrolyte is a mixture of water and methanol. The proportions of the mixture may be varied and improved performance has been obtained with amounts of water up to 70% of the weight of the mixture. The preferred proportions are about 20% to 50% of water.

For the solute component, a compound is suitable which is substantially soluble in the solvent and forms therewith an electrolytically conductive solution, and which in such solution is electrolytically reactive toward the negative electrode. Compounds which have been found to be suitable are the chlorides, nitrates and perchlorates of magnesium and the metals which are electronegative with respect to magnesium in the solution, which includes essentially those metals which are at least as high as magnesium in the electromotive series. At ordinary temperatures magnesium perchlorate exists in the anhydrous form and in the form of various hydrates, and magnesium chloride and magnesium nitrate are normally in the form of the hexahydrates $MgCl_2.6H_2O$ and $Mg(NO_3)_2.6H_2O$. Any of these forms is suitable for use and for convenience the compounds will herein be referred to as the chloride, nitrate and perchlorate respectively. Mixtures of the mentioned compounds may be used. The described chlorides and nitrates are preferred.

In accordance with the present invention, there is included in the cell a compound from the group consisting of chromium trioxide and the salts of chromic acid which possess at least a slight degree of solubility in water, that is, varying from sparingly soluble to extremely soluble. Such compound assists in inhibiting the spontaneous corrosion of the magnesium electrode. Examples of compounds which may be used are chromium trioxide, the chromates of ammonium, barium, calcium, lithium, potassium, sodium and strontium, and the dichromates of ammonium, barium, lithium, potassium and sodium. Compounds having a solubility as low as .00034 gram per 100 grams of water are suitable, barium chromate being an example of such a compound. Chromium trioxide and the chromate and dichromate of sodium have been used with excellent results. As is well known, chromium trioxide is the anhydride of chromic acid, and in the electrolyte it exists in solution in the water as chromic acid. Any one of the compounds described, or a mixture thereof, may be used. For convenience, such inhibiting compound will herein be called the chromium compound.

The chromium compound may be incorporated in the cell in any desired manner, as by introducing it directly into the electrolyte, or incorporating it in the separating member 12 or the depolarizing mix 14. The manner in which the inhibiting function is accomplished is not understood, but it is believed to be by the chromium compounds being present at the surface of the negative electrode 10 which is exposed to the electrolyte. Since the chromium compound is soluble to at least a slight degree in the water of the electrolyte solvent, and the separating member 12 and depolarizing mix 14 are moistened with the electrolyte, if the chromium compound is incorporated in these elements it is subsequently dissolved in the electrolyte and becomes available at the surface of the negative electrode. It is therefore, only required that the chromium compound be accessible to the electrolyte, that is, that the compound be in access relation with the electrolyte. The electrolyte, in turn, is in contact with the negative electrode.

The amount of chromium compound which may be used is not critical. Only a small amount is required, and an excessive amount should be avoided since this results in a waste of the compound and may interfere with the proper operation of the cell. Amounts of chromium compound which have been used with success are about .01% to 5.0%, in terms of $CrO_3$ based on the weight of the water in the solvent component, by which is meant in the specification and claims the free water and does not include the combined water which may be present, such as the water of hydration of the solute.

A specific example of a primary cell of the invention is one in which the physical structure is as described heretofore, the negative electrode 10 is of magnesium, the depolarizer 14 is a mixture of finely divided manganese dioxide and thermal acetylene black, the positive electrode 16 is of carbon, the electrolyte is a solution in which the solvent is a mixture of substantially equal parts by weight of water and methanol and the solute is magnesium chloride hexahydrate in an amount substantially equal in weight to that of the solvent, and sodium chromate is included in the electrolyte containing $CrO_3$ in an amount equal to approximately 0.06% of the weight of the free water in the solvent component. The initial open circuit voltage of such a cell is approximately 2.4 volts.

The table given hereinafter shows performance data which illustrate the benefits obtained from the invention. A number of batteries each composed of nine series-connected cells were tested for their energy delivering capacity. The cells were of the same structure as in the foregoing example except that in the different batteries they had different proportions of water and methanol in the solvent component of the electrolyte as indicated in the table. One group of the batteries was tested when they were fresh, that is, within 48 hours after manufacture, and another group was tested after being in storage at about 70° F. for three months. In the tests, the batteries were continuously discharged by being connected to a load circuit having 15,000 ohms resistance. In each case, the elapsed discharge time was noted when the voltage of the battery had dropped to 1.67 volts per cell. Each value given is the average of the results for a number of similar batteries.

Table

| Solvent Composition Percent by Weight | | Capacity in Hours Service To End Point of 1.67 Volts Per Cell | |
|---|---|---|---|
| H₂O | CH₃OH | Fresh | 3 Months |
| 0 | 100 | 154 | 144 |
| 5 | 95 | 162 | 162 |
| 10 | 90 | 173 | 168 |
| 20 | 80 | 214 | 180 |
| 40 | 60 | 260 | 179 |
| 50 | 50 | 236 | 153 |
| 80 | 20 | 223 | 95 |
| 100 | 0 | 225 | 7 |

The data given in the table show that superior performance is obtained with a solvent mixture containing about 20% to 50% of water. A substantial advantage is obtained with the use of water in any amount up to 70% of the solvent component. A water content as little as 5% and even less produces a substantial advantage. As the water content is increased to between 40% and 50%, the shelf life begins to decline but it remains greater than with 100% methanol. With a water content of 80% the fresh capacity is very good but the shelf life is undesirably low, and experience has shown that about 70% is the maximum water content which will provide improved capacity and satisfactory shelf life. The presence of the chromium compound and a substantial amount of methanol is required to inhibit spontaneous corrosion of the magnesium electrode and provide a substantial shelf life. The data show that with a water content of 40% to 50% the fresh capacity is greater than with 100% water.

What is claimed is:

1. In a primary cell having a positive electrode and a magnesium negative electrode, an electrolyte in contact with said electrodes having a solvent component comprising a mixture of water and methanol, and a compound in access relation with said electrolyte from the group consisting of chromic acid and the salts of chromic acid having at least a slight degree of solubility in water.

2. In a primary cell having a positive electrode and a magnesium negative electrode, an electrolyte in contact with said electrodes having a solvent component comprising a mixture of water and methanol and a solute component comprising a compound from the group consisting of the chlorides, nitrates and perchlorates of magnesium and of the metals electronegative to magnesium in said electrolyte, and a compound in access relation with said electrolyte from the group consisting of chromic acid and the salts of chromic acid having at least a slight degree of solubility in water.

3. The primary cell as claimed in claim 2 in which the proportion by weight of water in the water-methanol mixture is up to 70%.

4. The primary cell as claimed in claim 2 in which the proportions by weight of water in the water-methanol mixture is about 20% to 50%.

5. The primary cell as claimed in claim 2 in which the amount of $CrO_3$ in the compound from the group consisting of chromic acid and the salts of chromic acid is about .01% to 5.0% of the weight of the water in the solvent component of the electrolyte.

IVAN C. BLAKE.

REFERENCES CITED

The following references are of record in the file of this patent:

UNITED STATES PATENTS

| Number | Name | Date |
|---|---|---|
| 2,343,194 | Lawson | Feb. 29, 1944 |
| 2,428,850 | Lawson | Oct. 14, 1947 |
| 2,547,907 | Fry | Apr. 3, 1951 |

FOREIGN PATENTS

| Number | Country | Date |
|---|---|---|
| 13,807 | Great Britain | of 1890 |